United States Patent
Lindblad et al.

(10) Patent No.: US 11,872,791 B2
(45) Date of Patent: Jan. 16, 2024

(54) REPLACING KEYBOARD CHARACTERS

(71) Applicant: Global Resale LLC, Austin, TX (US)

(72) Inventors: Leon Peter Robert Lindblad, Poole (GB); Sacha James Bascombe, Poole (GB)

(73) Assignee: Global Resale LLC, Austin, TX (US)

( * ) Notice: Subject to any disclaimer, the term of this patent is extended or adjusted under 35 U.S.C. 154(b) by 0 days.

(21) Appl. No.: 18/080,147

(22) Filed: Dec. 13, 2022

(65) Prior Publication Data

US 2023/0112915 A1  Apr. 13, 2023

Related U.S. Application Data

(62) Division of application No. 17/184,269, filed on Feb. 24, 2021, now abandoned.

(30) Foreign Application Priority Data

Feb. 25, 2020 (GB) ..................................... 2002625

(51) Int. Cl.
*B32B 37/12* (2006.01)
*B32B 38/00* (2006.01)
(Continued)

(52) U.S. Cl.
CPC ...... *B32B 37/1292* (2013.01); *B32B 38/0004* (2013.01); *B32B 38/145* (2013.01);
(Continued)

(58) Field of Classification Search
CPC ............ B32B 37/1292; B32B 38/0004; B32B 38/145; B32B 38/162; B32B 2307/41;
(Continued)

(56) References Cited

U.S. PATENT DOCUMENTS 4,075,389 A * 2/1978 Vassiliades ............... C09J 7/201
428/313.5
2003/0161672 A1* 8/2003 Roberson ................... B41J 5/14
400/490

(Continued)

FOREIGN PATENT DOCUMENTS

DE  4100174 A1  9/1991
JP  H11-231784 A * 8/1999

(Continued)

OTHER PUBLICATIONS

Brother, "Brother Scan n Cut Tutorials: Creating Stickers", YouTube Video, Feb. 2015, https://www.youtube.com/watch?v=VbdhOQe50KM. (Year: 2015).*

(Continued)

*Primary Examiner* — Christopher W Raimund
(74) *Attorney, Agent, or Firm* — Richard M. Goldberg

(57) ABSTRACT

A computer keyboard is refurbished by applying to its keys stickers each bearing a character designating the action of a respective key. For application of the stickers to the keys, the stickers are configured and arranged on an application tape in a layout congruent with the layout of the keys by a digital scan of the keyboard. The stickers are temporarily attached to the application tape by a peelable adhesive and then permanently attached to the keys by a pressure-sensitive permanent adhesive.

16 Claims, 11 Drawing Sheets

(51) Int. Cl.
*B32B 38/16* (2006.01)
*H01H 13/88* (2006.01)
*H01H 13/83* (2006.01)

(52) U.S. Cl.
CPC .......... *B32B 38/162* (2013.01); *H01H 13/88* (2013.01); *B32B 2307/41* (2013.01); *B32B 2457/00* (2013.01); *H01H 13/83* (2013.01)

(58) Field of Classification Search
CPC .... B32B 2457/00; H01H 13/88; H01H 13/83; H01H 2219/008; B65C 1/02; G09F 3/10; G09F 3/02; G09F 2003/0208; G09F 2003/0264; G06F 3/0202
See application file for complete search history.

(56) References Cited

U.S. PATENT DOCUMENTS

| | | | | |
|---|---|---|---|---|
| 2014/0193786 A1* | 7/2014 | Ivanov | ............... | G09B 13/00 434/227 |
| 2015/0309591 A1* | 10/2015 | Semeco | ............... | G06F 3/018 345/171 |

FOREIGN PATENT DOCUMENTS

| | | | |
|---|---|---|---|
| JP | 2006-235893 | A | 9/2006 |
| JP | 2006235893 | A * | 9/2006 |
| KR | 2001-0000863 | U | 1/2001 |
| TW | 201102863 | A1 | 1/2011 |

OTHER PUBLICATIONS

Keyshorts Blog, How to Remove Keyboard Stickers Like a Pro, https://keyshorts.com/blogs/blog/how-to-remove-keyboard-stickers-like-a-pro, Aug. 2018. (Year: 2018).*

Maxiaids, Large Print Keyboard Labels-White on Black, https://www.maxiaids.com/large-print-keyboard-labels-white-on-black, Aug. 15, 2016. (Year: 2016).*

"Brother Scan n Cut Tutorials: Creating Stickers", YouTube Video, Feb. 2015, https:/www.youtube.com/watch?v=VbdhOQe50km (Year: 2015).

* cited by examiner

REPLACING KEYBOARD CHARACTERS

BACKGROUND OF THE INVENTION

This invention concerns the refurbishment of computer keyboards by replacing characters on the keys thereof.

A computer keyboard comprises a plurality of keys manually operable by engagement of a user's fingers with contact surfaces thereof and bearing characters to designate their action. With extended use, the characters commonly become illegible through wear or soiling. Then the keyboard may be replaced; but it is cheaper and ecologically better to refurbish the keyboard. For this purpose, stickers bearing key characters may be purchased and applied individually to those keys which have become illegible. But then the form of the characters on the stickers is likely to be different from that of the original characters, giving the keyboard an untidy and possibly distracting appearance.

Another reason for refurbishing a keyboard is to adapt it to a new use. For instance; the user may wish: to utilise a simplified character, eg if working with children; to use a language different from the original, with other characters and/or diacritics; to have the characters in a large format, more easily read by a visually impaired user; or to use the keyboard particularly for gaming. Such adaptation requires the application of a large number of stickers—a keyboard may have more than 100 keys—which is tiresome and time consuming.

SUMMARY OF THE INVENTION

For the avoidance of uncertainty, the term "refurbishment" as used herein in intended to include adapting a keyboard to a new use as well as dealing with worn or soiled characters.

It is an object of the invention to facilitate the refurbishment of a computer keyboard by the application of character-bearing stickers.

Thus according to a first aspect of the invention there is provided apparatus for refurbishing a computer keyboard, which apparatus comprises:
  a first digital image of the keyboard;
  a sticker sheet comprising a plurality of stickers respectively corresponding to the keys of the keyboard and each bearing a character designating the action of a respective key and a back layer to which the stickers are releasably attached and removable therefrom for attachment to their respective keys; and
  an adhesive for attaching the stickers to their respective keys;
  wherein the stickers are configured and arranged on the back layer in a layout congruent with the layout of the keys on said first digital image.

By means of the sticker sheet, stickers may be applied to all the keys of a keyboard at once, rather than one at a time.

According to a second aspect of the invention there is provided a method of refurbishing a computer keyboard comprising a plurality of keys manually operable by engagement of a user's fingers with contact surfaces thereof and bearing characters to designate their action, which method comprises:
  providing apparatus according to the first aspect of the invention;
  optically scanning the keyboard to produce said first digital image thereof;
  creating a second digital image of the keyboard by delineating on the first digital image the boundaries of the contact surfaces of the keys;
  creating a third digital image of the keyboard by superimposing on the second digital image characters corresponding to the keys within the respective boundaries thereof;
  printing the third digital image on to an image transfer sheet comprising a clear front layer releasably secured to a back layer by means of a first adhesive;
  cutting through the front layer around the delineated boundaries to separate the printed images of individual keys from the surrounding portion of the front layer;
  peeling the surrounding portion of the front layer off the back layer to leave the printed images of the individual keys attached to the back layer;
  laying application tape over the printed images of the individual keys attached to the back layer, which application tape has a releasable coating of a second adhesive which adheres to the printed images of the individual keys;
  peeling the application tape away from the back layer to lift the printed images of the individual keys off the back layer, with the first adhesive on the back of the printed images;
  overlaying the keyboard with the application tape carrying the printed images of the individual keys, locating the printed images of the individual keys congruently with the keys of the keyboard, and pressing the printed images of the individual keys on to the corresponding keys of the keyboard and into adherence therewith by means of the first adhesive between the printed images and the keys; and
  peeling the application tape away from the keyboard to leave the printed images of the individual keys adhered to the corresponding keys by means of the first adhesive on the back of the printed images and remove the second adhesive from the front of the printed images.

In a third aspect the invention extends to apparatus for refurbishing a computer keyboard comprising a plurality of keys manually operable by engagement of a user's fingers with contact surfaces thereof and bearing characters to designate their action, which apparatus comprises a first digital image of the keyboard, an image transfer sheet printed with printed images of the keys delineated with the boundaries of the contact surfaces thereof and, within the delineated boundaries, characters respectively corresponding to the keys, all configured and arranged congruently with said first digital image, wherein the image transfer sheet has a clear front layer releasably attached by means of a first adhesive and the printed images have on their backs a coating of a second adhesive for adhering the printed images to the keys of the keyboard.

BRIEF DESCRIPTION OF THE DRAWINGS

Other features of the invention will be apparent from the following description, which is made by way of example only with reference to the accompanying illustrations which are schematic and in which—

DETAILED DESCRIPTION

Figure 1:
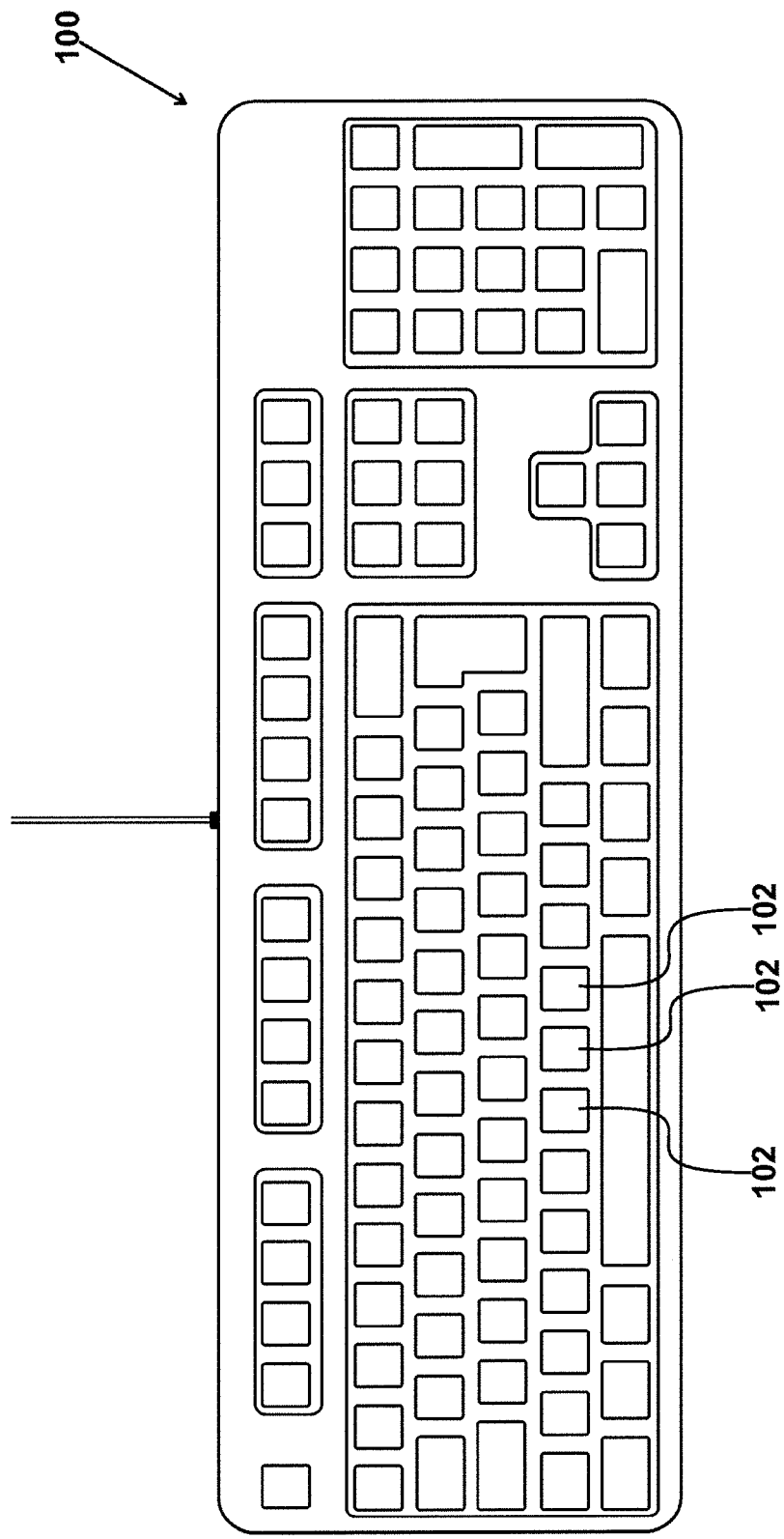
FIG. 1 shows a computer keyboard indicating the keys and contact surfaces thereof.

Referring first to FIG. 1, this shows an essentially conventional computer keyboard indicated at 100. The keyboard 100 has more than a hundred keys and includes a "QWERTY" alphabetic section as well as numeric keys and keys with particular functions, all marked on the keys by appropriate characters. Each key has an upper contact surface, as indicated at 102 in FIG. 1 for the B, N and M keys by way of example, for engagement with a user's fingers. Thus, as is well known, for a particular action a user engages a particular key and presses it downwards. Each contact surface is slightly dished, and the sides of the keys slope downwards from the contact surface, but it should be understood that this form is not essential to the invention.

Figure 2:
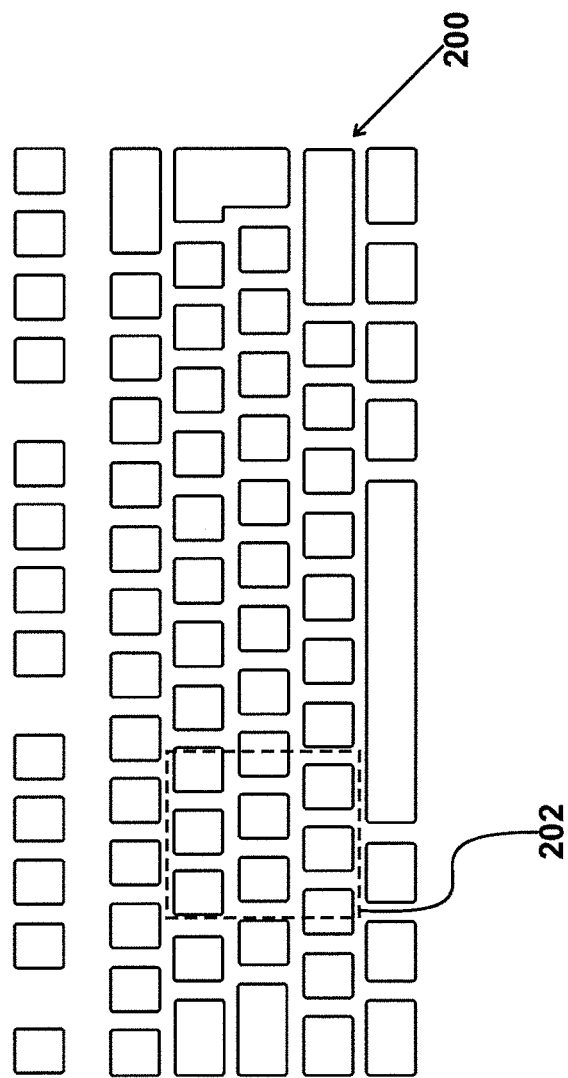
FIG. 2 shows a first digital image of a computer keyboard to be refurbished, produced by optical scanning.

The first step in implementing the invention in the refurbishment of a computer keyboard is to optically scan the keyboard to produce a first digital image 200 as indicated in FIG. 2. It will be noted that the first digital image 200 of FIG. 2 does not correspond to the keyboard 100 shown in FIG. 1. This is to emphasise that the invention is not limited to the refurbishment of any specific computer keyboard, but rather is applicable to the refurbishment of computer keyboards in general. An arbitrary area of the first digital image 200 is in FIG. 2 indicated in broken lines at 202. The area 202 contains the images of the keys W, E, R, S, D, X and C and parts of the images of the F and Z keys.

Figure 3:
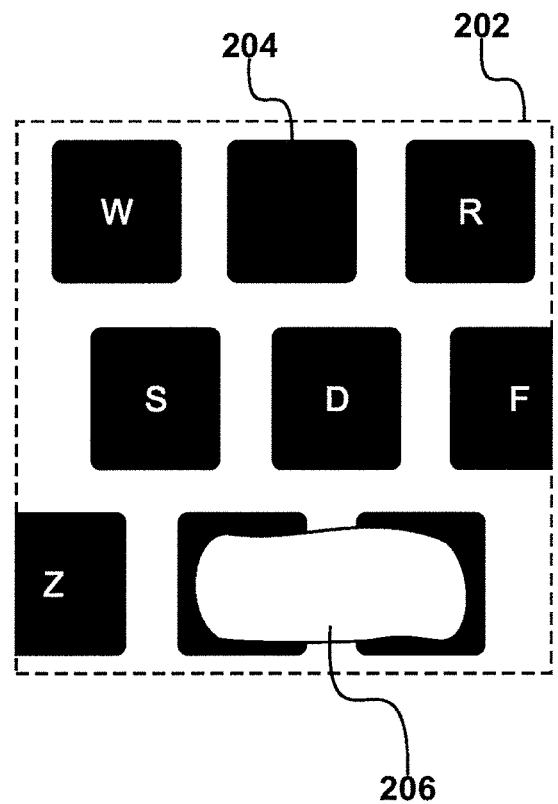
FIG. 3 shows enlarged and reoriented in relation to FIG. 2 an area of the first digital image of the keyboard to be refurbished.

In FIG. 3 the area 202 of the first digital image 200 is substantially enlarged and reoriented (rotated right) relative to FIG. 2, for simplicity of illustration. Hereinafter the invention will be described mostly in relation to the area 202, but it should be understood that the operations described apply to the entirety of the image 200 and not just to the area 202.

To illustrate the need for the imaged computer keyboard to be refurbished, the E character 204 is shown in FIG. 3 as worn away and the X and C characters are illegible owing to a spillage of typing correction fluid 206.

Figure 4:
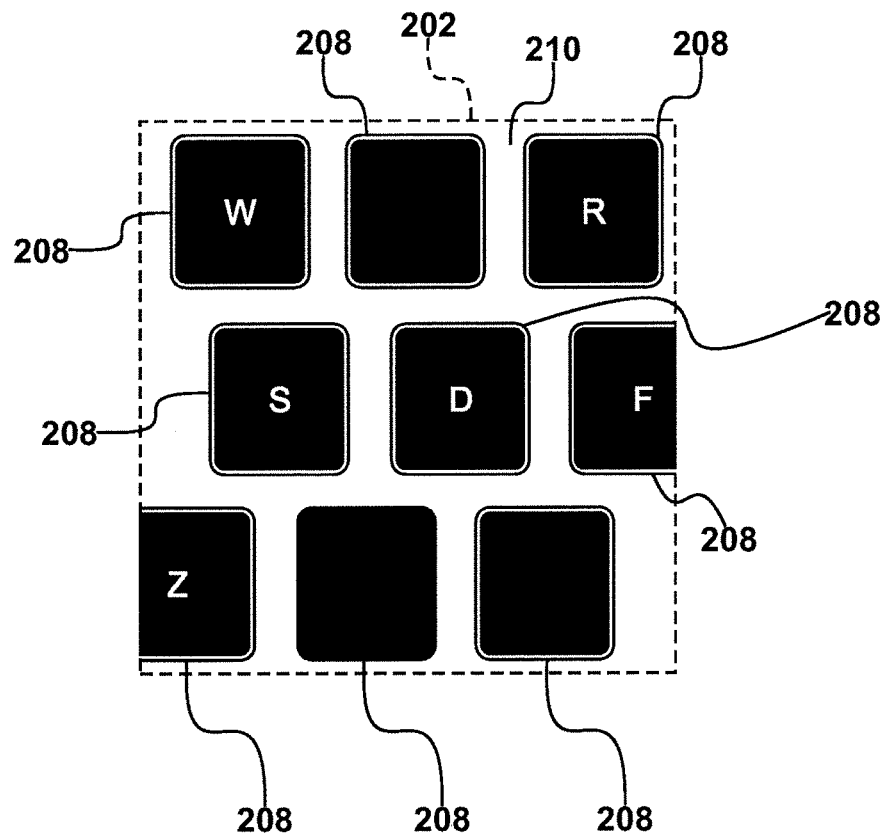
FIG. 4 is a view corresponding to FIG. 3 showing the same area of a second digital image of the keyboard to be refurbished, produced by delineating on the first digital image the boundaries of the contact surfaces of the keys thereof.

The second step in implementing the invention is illustrated by FIG. 4. Boundaries 208 of the images of the contact surfaces of the individual keys are delineated to create a second digital image 210 from the first digital image 200 (FIG. 2).

Figure 5:
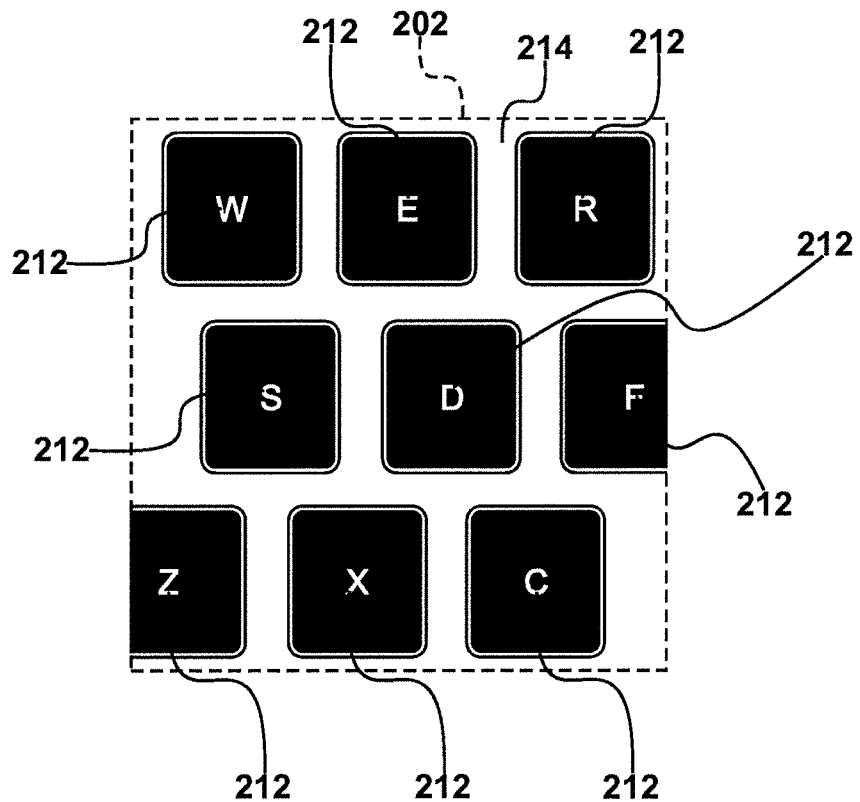
FIG. 5 is a view corresponding to FIG. 4 showing the same area of a third digital image of the keyboard to be refurbished, produced by superimposing on the second digital image characters corresponding to the keys within the respective boundaries thereof.

The third step in implementing the invention is illustrated by FIG. 5. Characters 212 corresponding to the individual keys are superimposed on the second digital image 210 (FIG. 4), within the boundaries 208 (FIG. 4) delineated in the second step of the invention, so as to create a third digital image 214 of the keyboard to be refurbished.

Figure 6A:
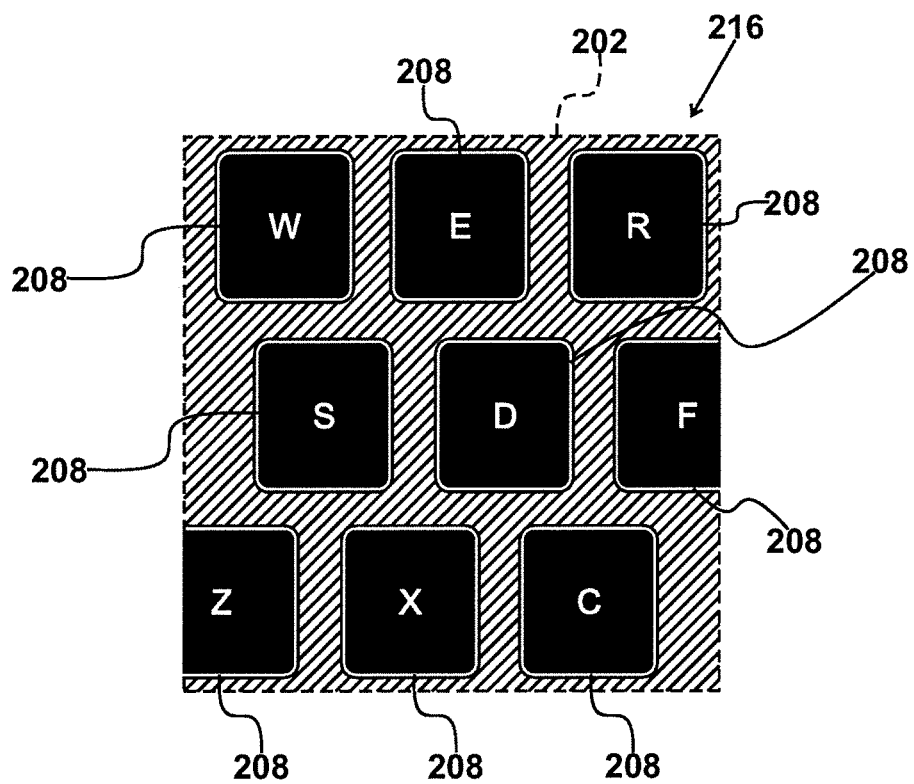
FIG. 6 illustrates the third digital image of the keyboard to be refurbished printed upon an image transfer sheet comprising a clear front layer secured to a back layer by means of a first adhesive, FIG. 6a being a plan view and FIG. 6b being a side elevation.
Figure 6B:
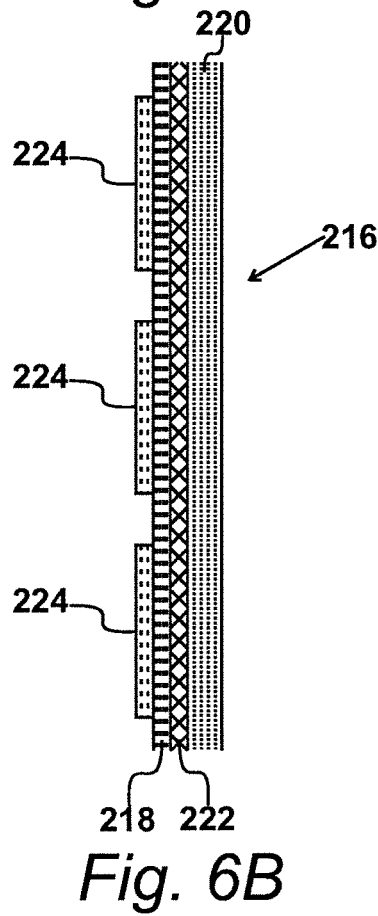

At the next step in implementing the invention, illustrated by FIG. 6, the third digital image 214 (FIG. 5) is printed on to an image transfer sheet indicated at 216. The image transfer sheet 216, which may be of the kind designated IJ180 as supplied by the 3M Company, comprises a clear front layer 218 adhered to a back layer 220 by means of a first adhesive 222, as shown in the side elevation of FIG. 6b. The first adhesive 222 is of a silvery-grey colour indicated by cross-hatching in FIG. 6a. The images of the individual keys, indicated at 224 in FIG. 6b, are printed on the front surface of the clear front layer 218 of the image transfer sheet 216.

It should be noted here that FIG. 6b (and similarly FIGS. 8b and 9b) show thicknesses greatly exaggerated, for clarity of illustration. Thus the clear front layer 218, the back layer 220, the first adhesive 222 and particularly the printed images 224 of the individual keys are in actuality much thinner than they appear in the side elevation drawings.

Figure 7:
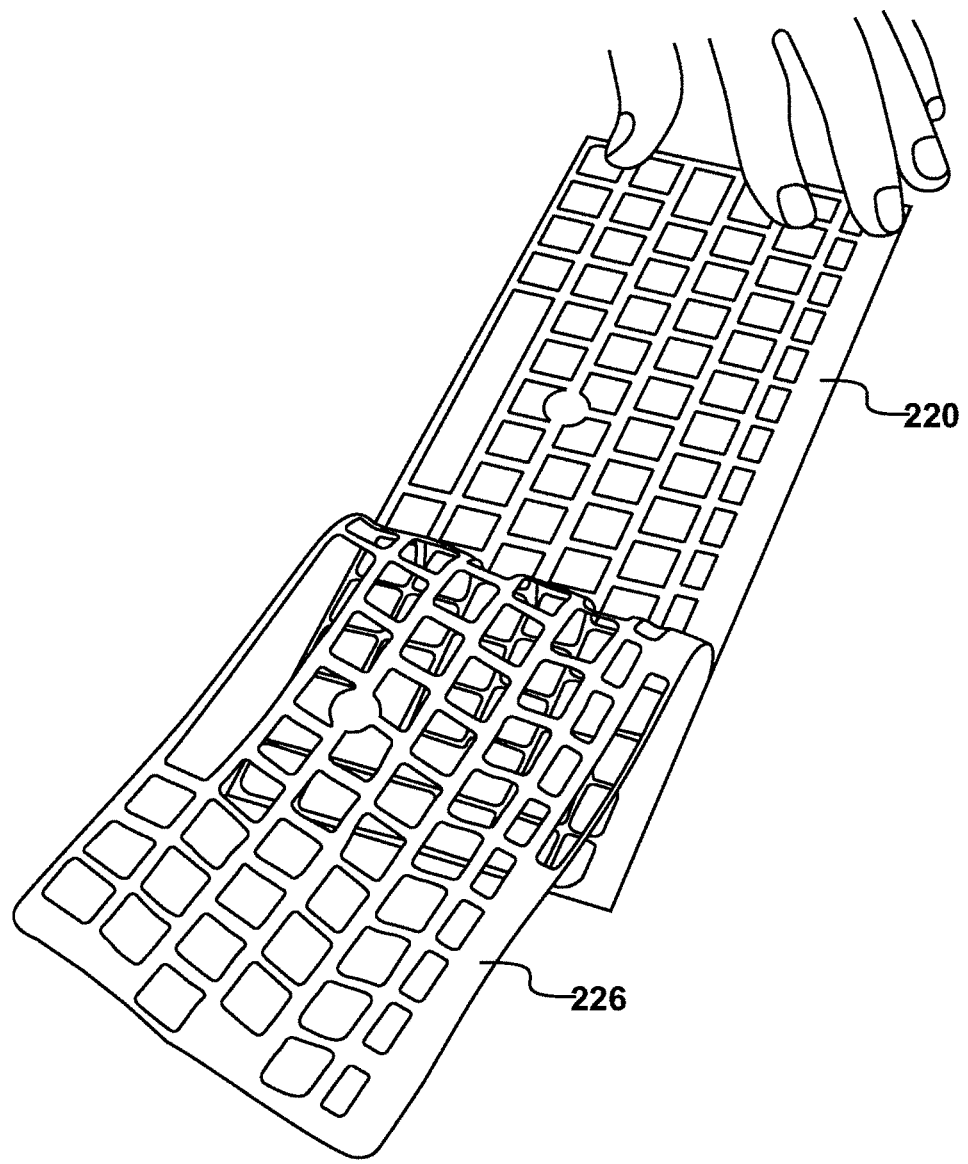
FIG. 7 shows front layer of the image transfer sheet being peeled away from the back layer thereof.

As a next step in implementing the invention, the printed images 224 of the individual keys are mutually separated in the form of individual stickers. Data representing the delineated boundaries 208 (shown white in FIG. 6a) are used to create a digital cut file which in turn controls kiss cuts through the clear front layer 218 and the first adhesive 222 (but not the back layer 220). Then the portion 226 of the front layer 218 together with the first adhesive 222 underlying it is peeled away from the back layer 220 in the form of a mesh-like matrix as shown in FIG. 7. This leaves the images 224 etc (FIG. 6b) of the individual keys printed on the clear front layer 218 separated from one another in the form of stickers adhered to the back layer 220 by means of the first adhesive 222.

Figure 8A:
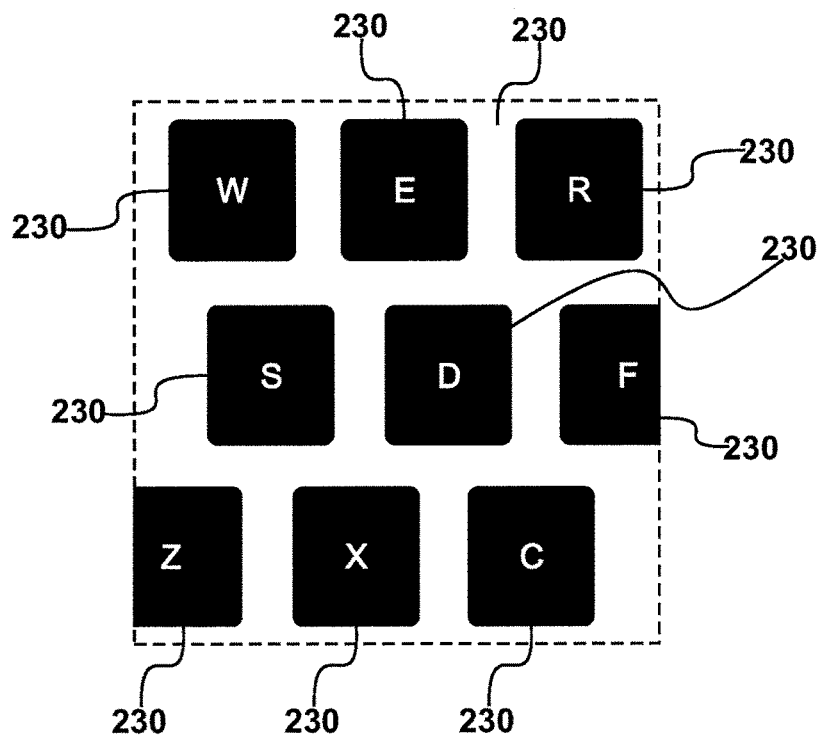
FIG. 8 illustrates the image transfer sheet after the front layer has been peeled away therefrom and application tape put in its place, FIG. 8a being a plan view and FIG. 8b being a side elevation.
Figure 8B:
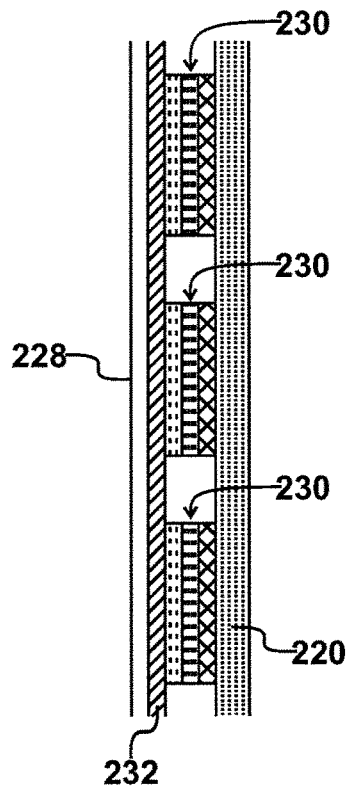

Next, as illustrated by FIG. 8, clear application tape 228 such as that sold under the name detape and available from MDP Supplies is laid over the front of the mutually separated key stickers 230. The application tape 228 has a backing of a second adhesive 232 whereby it adheres to the key stickers 230. And from a comparison of FIG. 8b with FIG. 6b it will be understood that each of the key stickers 230 has a sandwich structure comprising an image of the key (with its appropriate character) printed on a clear layer backed by the first adhesive.

Figure 9A:
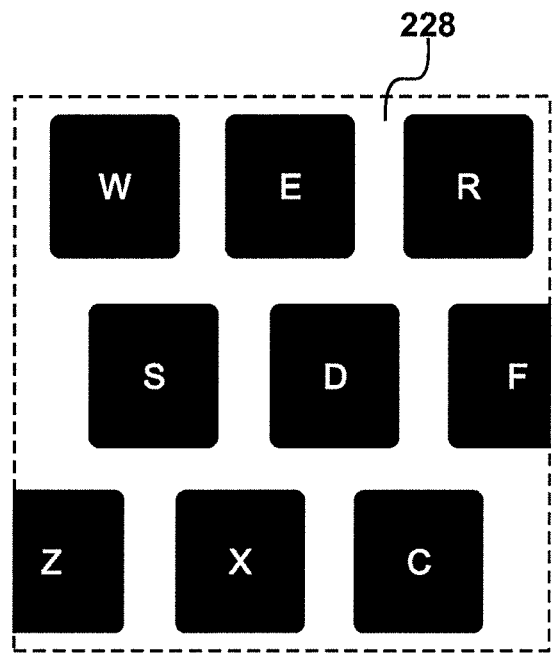
FIG. 9 is a view corresponding to FIG. 8 showing the application tape peeled away from the image transfer sheet, FIG. 9a being a plan view and FIG. 9b being a side elevation.
Figure 9B:
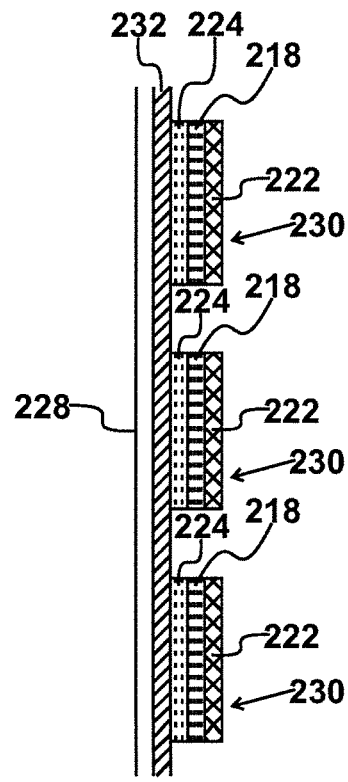

The adhesion of the second adhesive 232 to the key stickers 230 is greater than the adhesion of the first adhesive 222 (FIG. 6b) to the back layer 220. Thus the application tape 228 can be peeled away to lift from the back layer 220 the key stickers 230 adhered to the application tape 228 by the second adhesive 232, each sticker 230 being backed by the first adhesive 222, as illustrated by FIG. 9.

Figure 10:
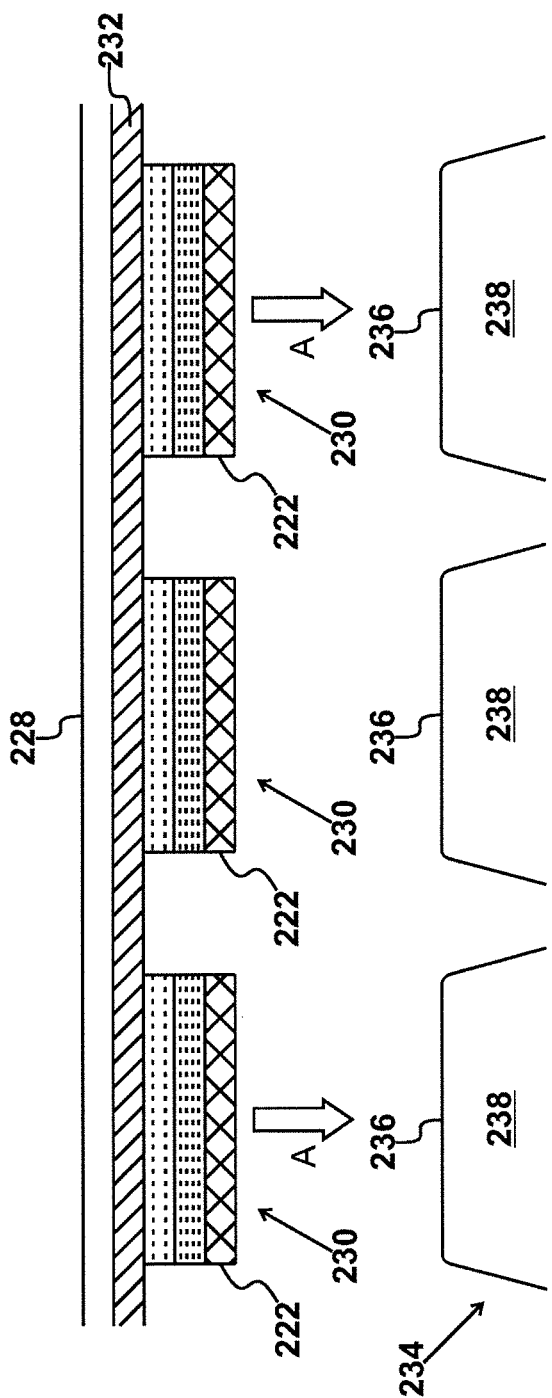
FIG. 10 is a view in end elevation illustrating the peeled-away application tape, carrying replacement characters, being applied to a computer keyboard.

Then the application tape 228 is applied to the keyboard 234 to be refurbished as indicated by the arrows A in FIG. 10 so that the first adhesive 222 backing each of the stickers 230 engages the contact surface 236 of a corresponding key 238. The first adhesive 222 is a pressure-sensitive adhesive that adheres permanently to the contact surfaces 236 of the keys 238 when pressure is applied; but before that it allows the application tape 228 to be adjusted to accurately position the stickers 230 congruently with the contact surfaces 236. Pressure is applied to adhere the stickers 230 permanently to the contact surfaces 236 of the keys 238 only after they have been accurately positioned. And it is recommended that, to assure the proper adherence of the stickers 230 to the contact surfaces 236, the contact surfaces 236 be cleaned beforehand with a cleansing agent such as isopropyl alcohol that leaves no deleterious residue on the keys 238.

Figure 11:
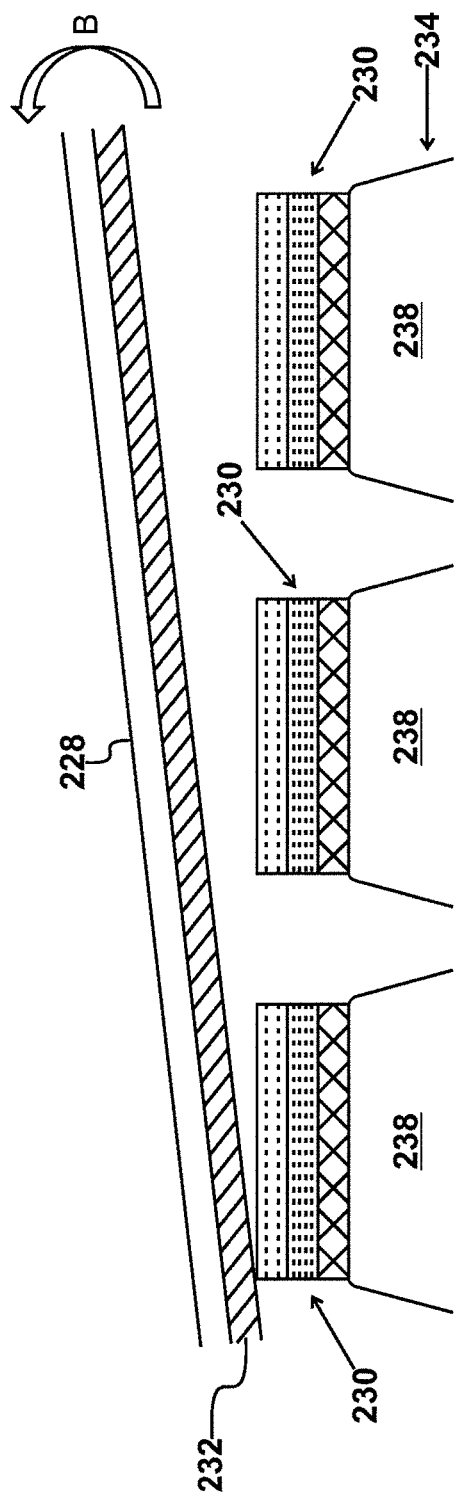
FIG. 11 is a view corresponding to FIG. 10 illustrating the removal of the application tape being removed from the computer keyboard to leave the replacement characters adhered to the keys thereof.

Pressure having been applied to permanently adhere the stickers 230 to their respective keys by means of the first adhesive 232, the application tape 228 with its second adhesive backing 232 is peeled away as indicated by the arrow B in FIG. 11. This leaves the stickers 230 permanently adhered to the keys 238, and so the keyboard 234 is refurbished.

It will now be appreciated that the invention provides a sticker sheet which is different from those previously offered for refurbishment of a computer keyboard and requires the key stickers thereof to be removed from the sheet and applied to the keys one at a time—an inconvenient and time-consuming operation that may well be beyond the capacity of, say, a visually impaired person wanting larger/clearer keyboard characters. Thus a sticker sheet for refurbishing a computer keyboard according to the invention comprises a plurality of stickers 230 respectively corresponding to the keys 238 of the keyboard 234 and each bearing a character 212 (FIG. 5) designating the action of a respective key 238, and a back layer 220 to which the stickers 230 are releasably attached and removable therefrom for attachment to their respective keys 238 by means of the first adhesive 222, wherein the stickers 230 are configured and arranged on the back layer 220 in a layout congruent with the layout of the keys 238 on the keyboard 234. Preferably a sticker sheet according to the invention includes a front layer of application tape 228 engaging the stickers 230, whereby the stickers 230 may be peeled off the back layer 220 and applied to the keys 238 of the keyboard 234 in congruence therewith. It is also preferred that the first adhesive 222 be pressure sensitive.

The concept of a sticker sheet that comprises a plurality of stickers respectively corresponding to the keys of a keyboard and congruent therewith supports the provision through the invention of apparatus (hereinafter set out using the reference numerals of FIGS. 5 to 11 hereof) for refurbishing a computer keyboard 234 comprising a plurality of keys 238 manually operable by engagement of a user's fingers with contact surfaces 236 thereof and bearing characters 212 to designate their action, which apparatus comprises an image transfer sheet 216 printed with printed images 224 of the keys 238 delineated with the boundaries 208 of the contact surfaces 236 thereof and, within the delineated boundaries 208, characters 212 respectively corresponding to the keys 238, all configured and arranged to fit the keyboard 234 congruently, wherein the printed images 224 have on their backs a coating of a first adhesive 222 for adhering the printed images 224 to the keys 238 of the keyboard 234 and the image transfer sheet 216 has a clear front layer 228 releasably attached by means of a second adhesive 232. Preferably the first adhesive 222 adheres the printed images 224 to the keys 238 of the keyboard 234 more strongly than the second adhesive 232 adheres the printed images 224 to the front layer 228 of the image transfer sheet 216.

What is claimed is:

1. A method of refurbishing a computer keyboard comprising a plurality of keys manually operable by engagement of a user's fingers with contact surfaces thereof and bearing characters to designate their action, which method comprises:
   scanning the keyboard to produce a first image thereof;
   creating from said first image a second image by delineating on the first image the boundaries of the contact surfaces of the keys;
   creating from said second image a third image by superimposing on the second image characters corresponding to the keys within the respective boundaries thereof; and
   printing the third image on to an image transfer sheet comprising a clear front layer releasably secured to a back layer by a first adhesive, the third image of the image transfer sheet being congruent with the keyboard.

2. The method of refurbishing a computer keyboard as claimed in claim 1, which method comprises the step of cutting through the front layer around the delineated boundaries to separate the printed images of individual keys from a surrounding portion of the front layer.

3. The method of refurbishing a computer keyboard as claimed in claim 2, which method comprises the step of peeling the surrounding portion of the front layer off the back layer to leave the printed images of the individual keys attached to the back layer.

4. The method of refurbishing a computer keyboard as claimed in claim 3, which method comprises the step of laying application tape over the printed images of the individual keys attached to the back layer, which application tape has a releasable coating of a second adhesive which adheres to the printed images of the individual keys.

5. The method of refurbishing a computer keyboard as claimed in claim 4, which method comprises the step of peeling the application tape away from the back layer to lift the printed images of the individual keys off the back layer, with the first adhesive on the back of the printed images.

6. The method of refurbishing a computer keyboard as claimed in claim 5, which method comprises the step of overlaying the keyboard with the application tape carrying the printed images of the individual keys, locating the printed images of the individual keys congruently with the keys of the keyboard, and pressing the printed images of the individual keys on to the corresponding keys of the keyboard and into adherence therewith by the first adhesive between the printed images and the keys.

7. The method of refurbishing a computer keyboard as claimed in claim 6, which method comprises the step of peeling the application tape away from the keyboard to leave the printed images of the individual keys adhered to the corresponding keys by the first adhesive on the back of the printed images and remove the second adhesive from the front of the printed images.

8. The method of refurbishing a computer keyboard as claimed in claim 4, which method comprises the step of cleaning the contact surfaces of the keys with a cleansing agent before overlaying the keyboard with the application tape.

9. The method of refurbishing a computer keyboard as claimed in claim 4, wherein the adherence of the first adhesive to the keys of the keyboard is greater than the adherence of the second adhesive to the printed images of the keys.

10. The method of refurbishing a computer keyboard as claimed in claim 1, wherein the characters superimposed on the second image are substantially the same as the characters on the keys before the keyboard is refurbished.

11. The method of refurbishing a computer keyboard as claimed in claim 1, wherein the back layer is opaque.

12. The method of refurbishing a computer keyboard as claimed in claim 1, wherein the characters superimposed on the second image are different from the characters on the keys before the keyboard is refurbished.

13. The method of refurbishing a computer keyboard as claimed in claim 1, wherein the characters superimposed on the second image are one of:
   a character set simplified in relation to that of the keyboard before refurbishment,
   in a different language therefrom,
   in a font enlarged relative thereto or
   gaming characters.

14. The method of refurbishing a computer keyboard as claimed in claim 12, wherein the characters superimposed on the second image are in a different language therefrom.

15. The method of refurbishing a computer keyboard as claimed in claim 12, wherein the characters superimposed on the second image are in a font enlarged relative thereto.

16. The method of refurbishing a computer keyboard as claimed in claim 12, wherein the characters superimposed on the second image are gaming characters.

\* \* \* \* \*